United States Patent
Imazu et al.

(10) Patent No.: US 11,893,887 B2
(45) Date of Patent: Feb. 6, 2024

(54) PARKING LOT MANAGEMENT SYSTEM, PARKING LOT MANAGEMENT METHOD, AND STORAGE MEDIUM

(71) Applicant: TOYOTA JIDOSHA KABUSHIKI KAISHA, Toyota (JP)

(72) Inventors: Takanori Imazu, Susono (JP); Yoshiki Fukada, Susono (JP); Ryuji Okamura, Gotemba (JP); Takashi Hayashi, Mishima (JP); Kohki Baba, Susono (JP); Satoshi Omi, Ebina (JP); Akihiro Kusumoto, Susono (JP); Yuta Kataoka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/871,353

(22) Filed: Jul. 22, 2022

(65) Prior Publication Data
US 2023/0100856 A1 Mar. 30, 2023

(30) Foreign Application Priority Data
Sep. 24, 2021 (JP) .................. 2021-155843

(51) Int. Cl.
*G08G 1/14* (2006.01)
*G08G 1/09* (2006.01)
*B60W 30/06* (2006.01)
*B60W 50/14* (2020.01)

(52) U.S. Cl.
CPC ............. *G08G 1/148* (2013.01); *B60W 30/06* (2013.01); *B60W 50/14* (2013.01); *G08G 1/09* (2013.01); *B60W 2050/143* (2013.01); *B60W 2050/146* (2013.01)

(58) Field of Classification Search
CPC ............ G08G 1/148; G08G 1/09; G08G 1/04; B60W 30/06; B60W 50/14; B60W 2050/143; B60W 2050/146; B62D 15/0285
USPC ............. 340/932.2, 932, 933, 937, 988, 990
See application file for complete search history.

(56) References Cited

U.S. PATENT DOCUMENTS

| | | | |
|---|---|---|---|
| 2015/0039173 A1* | 2/2015 | Beaurepaire .......... | B60W 30/06 701/23 |
| 2017/0341640 A1* | 11/2017 | Liu ....................... | B60W 30/06 |
| 2018/0211539 A1* | 7/2018 | Boss ...................... | G08G 1/168 |
| 2019/0100139 A1* | 4/2019 | Koravadi ............. | B62D 15/027 |
| 2019/0286135 A1 | 9/2019 | Yasuda et al. | |
| 2020/0108824 A1* | 4/2020 | Bettger ................... | G01S 19/13 |
| 2021/0020046 A1* | 1/2021 | Zhou ..................... | G08G 1/145 |
| 2021/0039666 A1* | 2/2021 | Jeong .................. | B60W 40/105 |

FOREIGN PATENT DOCUMENTS

| | | |
|---|---|---|
| JP | 2019-156217 A | 9/2019 |
| JP | 2020-077213 A | 5/2020 |

* cited by examiner

*Primary Examiner* — Anh V La
(74) *Attorney, Agent, or Firm* — Sughrue Mion, PLLC

(57) ABSTRACT

Whether a vehicle is parked inside parking lines in a parking lot is detected. When the vehicle is detected not parked inside the parking lines, either the vehicle or the parking lines are moved in such a manner that the vehicle is parked inside the parking lines.

11 Claims, 9 Drawing Sheets

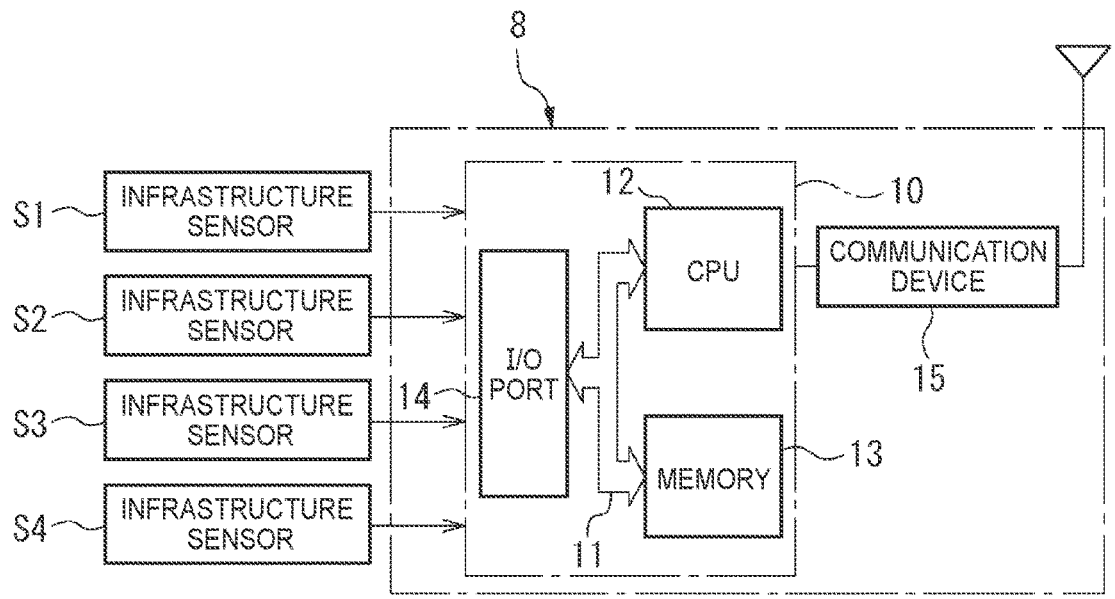
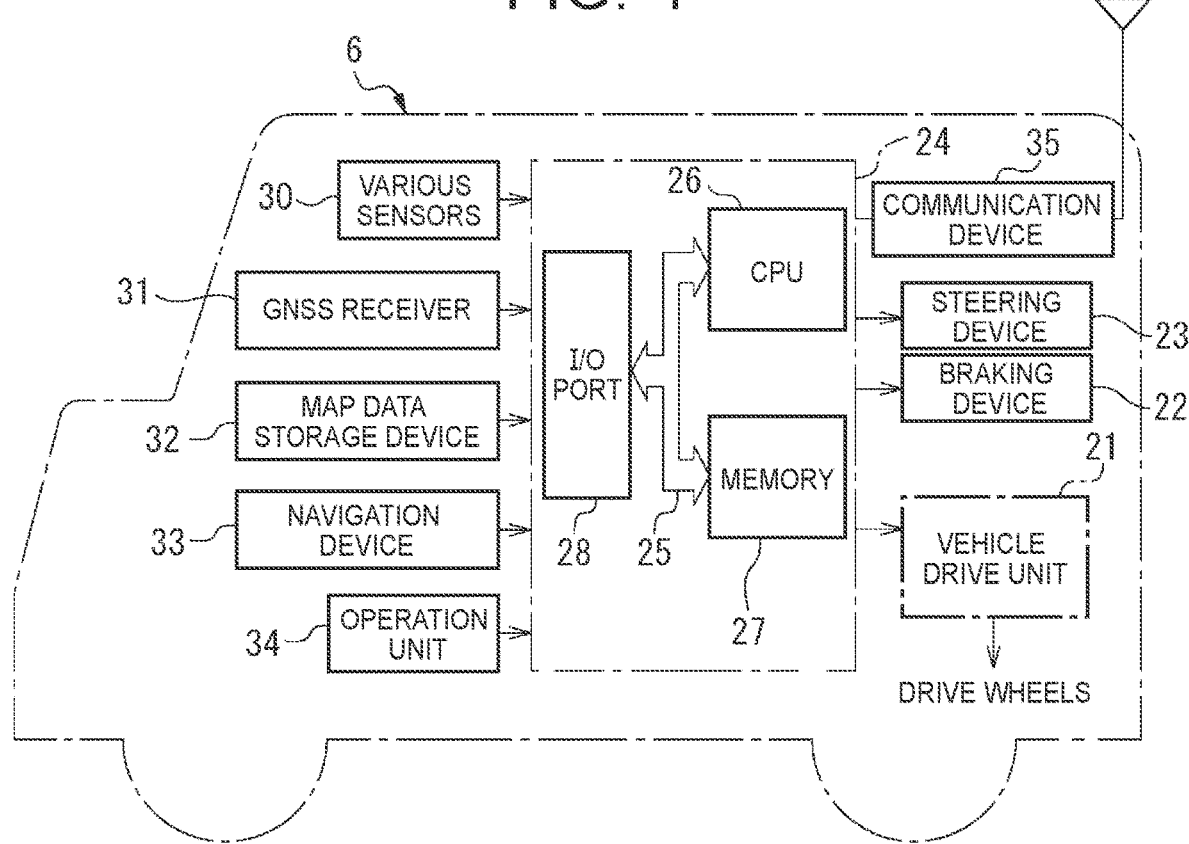

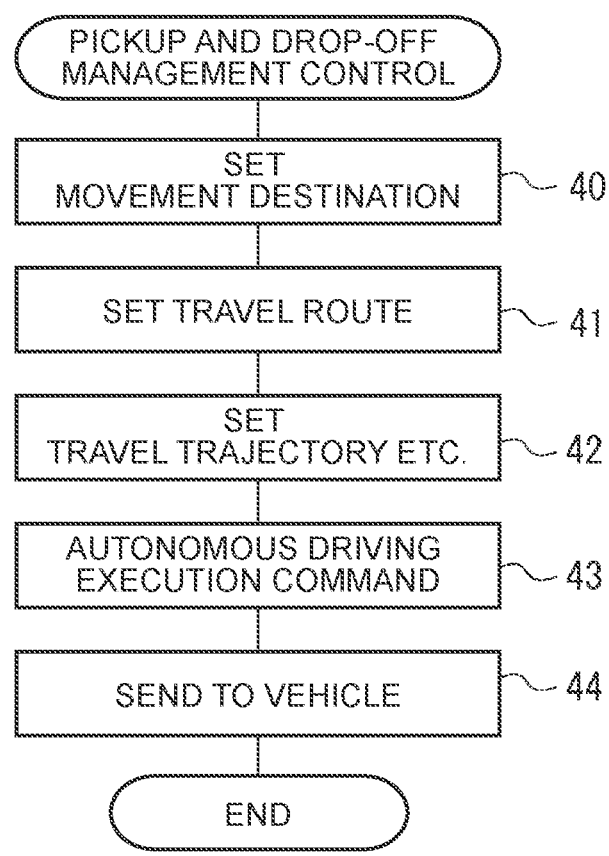

PARKING LOT MANAGEMENT SYSTEM, PARKING LOT MANAGEMENT METHOD, AND STORAGE MEDIUM

CROSS-REFERENCE TO RELATED APPLICATION

This application claims priority to Japanese Patent Application No. 2021-155843 filed on Sep. 24, 2021, incorporated herein by reference in its entirety.

BACKGROUND

1. Technical Field

The present disclosure relates to parking lot management systems, parking lot management methods, and storage mediums.

2. Description of Related Art

Regarding parking systems for both manually driven vehicles and autonomous vehicles, a parking system is known that has a function to detect an empty parking space and that sends information on the empty parking space from a management server of a parking lot to an autonomous vehicle so that the autonomous vehicle can reach the empty parking space without wandering around the parking lot and park in the empty parking space (see, e.g., Japanese Unexamined Patent Application Publication No. 2020-77213 (JP 2020-77213 A)).

SUMMARY

In such a parking system, however, when a manually driven vehicle is parked over the parking line, the parking space occupied by the manually driven vehicle over the parking line cannot be used as a parking space particularly for an autonomous vehicle. As a result, the parking lot cannot be effectively used for parking of vehicles.

In order to solve this problem, the present disclosure provides a parking lot management system including: a vehicle parked position detection unit configured to detect whether a vehicle is parked inside parking lines in a parking lot; and a movement management unit configured to, when the vehicle parked position detection unit detects that the vehicle is not parked inside the parking lines, move either the vehicle or the parking lines in such a manner that the vehicle is parked inside the parking lines.

The present disclosure further provides a parking lot management method including: detecting whether a vehicle is parked inside parking lines in a parking lot; and when the vehicle is detected not parked inside the parking lines, moving either the vehicle or the parking lines in such a manner that the vehicle is parked inside the parking lines.

The present disclosure further provides a non-transitory storage medium storing a program that causes a computer to perform functions including: detecting whether a vehicle is parked inside parking lines in a parking lot; and when the vehicle is detected not parked inside the parking lines, moving either the vehicle or the parking lines in such a manner that the vehicle is parked inside the parking lines.

The parking lot can thus be effectively used for parking of vehicles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 illustrates a pickup and drop-off management server;

FIG. 4 illustrates an autonomous vehicle;

FIG. 5 is a flowchart of pickup and drop-off management control;

DETAILED DESCRIPTION OF EMBODIMENTS

Figure 1:
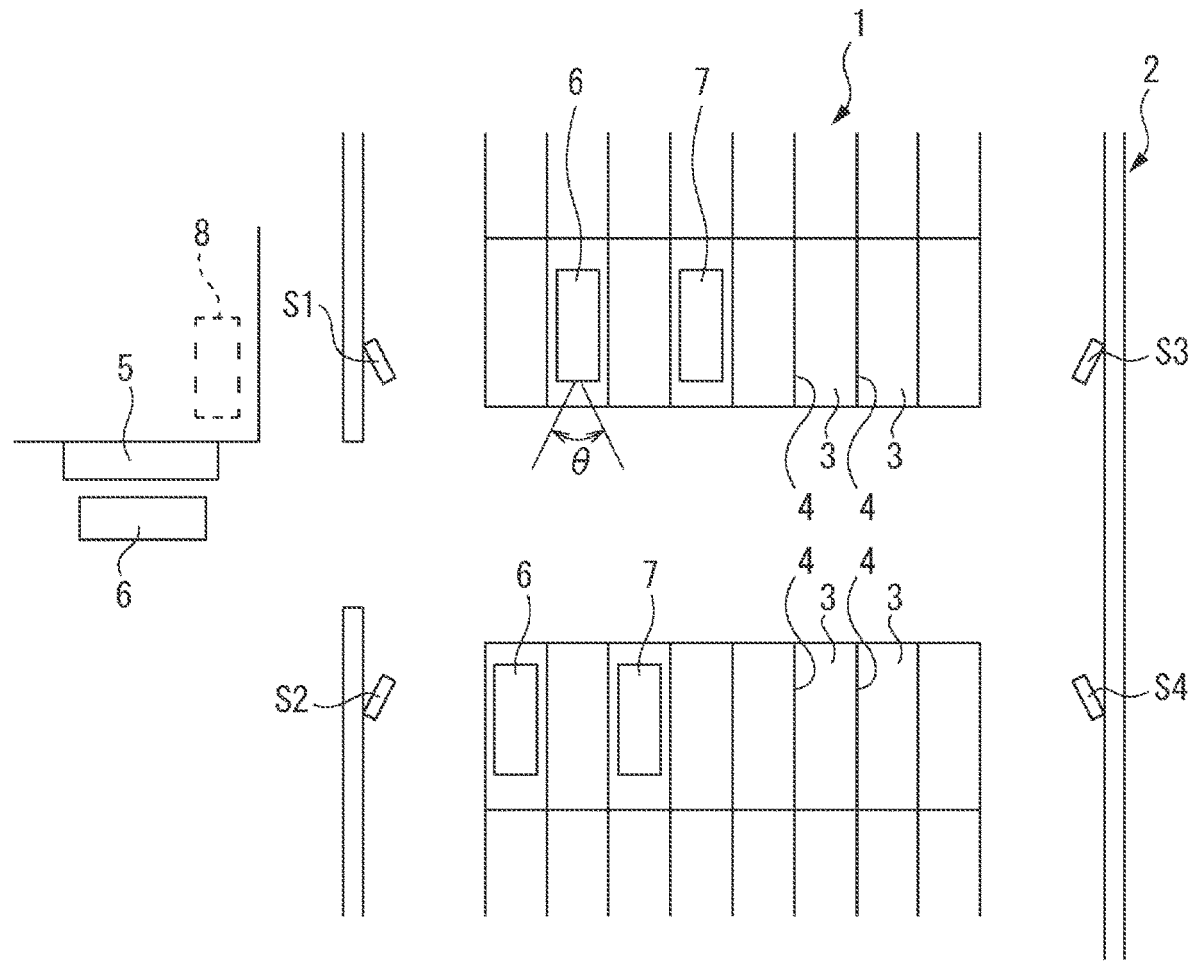
FIG. 1 is a plan view illustrating an example of an automatic parking lot.
Figure 2:
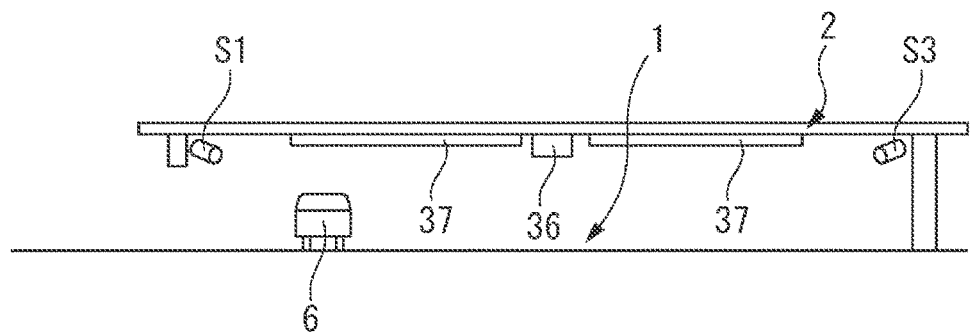
FIG. 2 is a side view of the automatic parking lot shown in FIG. 1.

FIG. 1 is a plan view illustrating only a part of an automatic parking lot, and FIG. 2 is a side view of the automatic parking lot shown in FIG. 1. Referring to FIGS. 1 and 2, the reference sign 1 indicates a parking lot, the reference sign 2 indicates an automatic parking lot building, the reference sign 3 indicates a parking space, the reference sign 4 indicates a parking line painted on the floor surface of the parking lot 1 and indicating the outer edge of each parking space 3, the reference sign 5 indicates a pickup and drop-off area, the reference sign 6 indicates an autonomous vehicle, and the reference sign 7 indicates a manually driven vehicle. This parking lot 1 provides an automatic parking service, namely an automated valet parking service. The automatic parking service is a service in which an autonomous vehicle 6 that has reached the pickup and drop-off area 5 for drop-off is moved to and parked in an empty parking space 3 by autonomous driving, and an autonomous vehicle 6 parked in a parking space 3 is moved to the pickup and drop-off area 5 for pickup by autonomous driving. In FIG. 1, the reference sign 8 indicates a pickup and drop-off management server. The pickup and drop-off management server 8 is installed in a parking management facility, and manages pickups and drop-offs of vehicles. As shown in FIG. 1, manually driven vehicles 7 can also be parked in this automatic parking lot.

A large number of infrastructure sensors are usually installed in the automatic parking lot in order to detect the vehicle parking condition in the parking lot 1 or to set a travel route for a vehicle. As described above, FIGS. 1 and 2 illustrate an area in the automatic parking lot. In the example shown in FIGS. 1 and 2, four infrastructure sensors S1, S2, S3, and S4 are installed in order to detect the state of this area in the automatic parking lot. The infrastructure sensors S1, S2, S3, and S4 are, for example, cameras or laser sensors. For example, when the infrastructure sensors S1, S2, S3, and S4 are cameras, image signals captured by the infrastructure sensors S1, S2, S3, and S4 are sent to the pickup and drop-off management server 8.

FIG. 3 shows the pickup and drop-off management server 8 in FIG. 1. As shown in FIG. 3, the pickup and drop-off management server 8 includes an electronic control unit 10. The electronic control unit 10 is a digital computer, and includes a central processing unit (CPU) (microprocessor) 12, a memory 13 composed of a read-only memory (ROM) and a random access memory (RAM), and an input/output port 14. The CPU 12, the memory 13, and the input/output port 14 are connected to each other by a bidirectional bus 11. As shown in FIG. 3, the image signals captured by the infrastructure sensors S1, S2, S3, and S4 are input to the electronic control unit 10. The memory 13 of the electronic control unit 10 stores map data of the parking lot 1.

FIG. 4 illustrates an example of an autonomous vehicle 6. Referring to FIG. 4, the reference sign 21 indicates a vehicle drive unit for applying a driving force to drive wheels of the autonomous vehicle 6, the reference sign 22 indicates a braking device for braking the autonomous vehicle 6, the reference sign 23 indicates a steering device for steering the autonomous vehicle 6, and the reference sign 24 indicates an electronic control unit mounted on the autonomous vehicle 6. As shown in FIG. 4, the electronic control unit 24 is a digital computer, and includes a CPU (microprocessor) 26, a memory 27 composed of a ROM and a RAM, and an input/output port 28. The CPU 26, the memory 27, and the input/output port 28 are connected to each other by a bidirectional bus 25. Various sensors 30 necessary for the autonomous vehicle 6 to perform autonomous driving, that is, sensors for detecting the state of the autonomous vehicle 6 and surroundings sensors for detecting the surroundings of the autonomous vehicle 6, are mounted on the autonomous vehicle 6. In this case, the sensors for detecting the state of the autonomous vehicle 6 are an acceleration sensor, a speed sensor, and an azimuth sensor, and the surroundings sensors for detecting the surroundings of the autonomous vehicle 6 are, for example, in-vehicle cameras, light detection and ranging (LIDAR) sensors, or radars for capturing images of the areas ahead of, to the side of, and behind the autonomous vehicle 6.

The autonomous vehicle 6 is provided with a Global Navigation Satellite System (GNSS) receiver 31, a map data storage device 32, a navigation device 33, and an operation unit 34 for performing various operations. The GNSS receiver 31 can detect the current position of the autonomous vehicle 6 (e.g., the latitude and longitude of the autonomous vehicle 6) based on information obtained from a plurality of artificial satellites. The current position of the autonomous vehicle 6 can therefore be acquired by the GNSS receiver 31. The GNSS receiver 31 is, for example, a Global Positioning System (GPS) receiver. The map data storage device 32 stores map data etc. necessary for the autonomous vehicle 6 to perform autonomous driving. The various sensors 30, the GNSS receiver 31, the map data storage device 32, the navigation device 33, and the operation unit 34 are connected to the electronic control unit 24. The autonomous vehicle 6 is equipped with a communication device 35 for communicating with the pickup and drop-off management server 8. As shown in FIG. 3, the pickup and drop-off management server 8 includes a communication device 15 for communicating with the autonomous vehicle 6.

In the example shown in FIG. 4, the vehicle drive unit 21 is an electric motor that is driven by a secondary battery or an electric motor that is driven by a fuel cell, and the drive wheels are driven and controlled by the electric motor according to an output signal from the electronic control unit 24. The braking device 22 performs braking control for the autonomous vehicle 6 according to an output signal from the electronic control unit 24, and the steering device 23 performs steering control for the autonomous vehicle 6 according to an output signal from the electronic control unit 24.

When a user who uses the automatic parking service parks his or her autonomous vehicle in the parking lot 1, the user sends a drop-off request together with a vehicle identification (ID) identifying his or her vehicle from, for example, his or her mobile terminal to the pickup and drop-off management server 8 via a communication network when, for example, his or her vehicle reaches the pickup and drop-off area 5. In response to the drop-off request, the pickup and drop-off management server 8 sets a travel route for the vehicle that allows the vehicle to move from the pickup and drop-off area 5 to an empty parking space 3 without coming into contact with other vehicles and pedestrians, and sends the set travel route to the user's vehicle. When the user's vehicle receives the set travel route from the pickup and drop-off management server 8, the user's vehicle is moved from the pickup and drop-off area 5 to the empty parking space 3 along the set travel route by autonomous driving.

The same applies when the user picks up his or her vehicle from the parking lot 1. For example, when the user reaches the pickup and drop-off area 5, the user sends a pickup request together with the vehicle ID identifying his or her vehicle from his or her mobile terminal to the pickup and drop-off management server 8 via the communication network. In response to the pickup request, the pickup and drop-off management server 8 sets a travel route for the vehicle that allows the vehicle to move from the parking space 3 where the vehicle is currently parked to the pickup and drop-off area 5 without coming into contact with other vehicles and pedestrians, and sends the set travel route to the user's vehicle. When the user's vehicle receives the set travel route from the pickup and drop-off management server 8, the user's vehicle is moved from the parking space 3 where the vehicle is currently parked to the pickup and drop-off area 5 along the set travel route by autonomous driving.

FIG. 5 shows a pickup and drop-off management control routine that is executed by the electronic control unit 10 when the pickup and drop-off management server 8 receives a drop-off request or a pickup request from an autonomous vehicle 6. Referring to FIG. 5, when the pickup and drop-off management server 8 receives a drop-off request from an autonomous vehicle 6, the electronic control unit 10 first sets the movement destination of the autonomous vehicle 6 to an empty parking space 3 from a large number of parking spaces 3 in step 40. Once the movement destination is set, the routine proceeds to step 41, and the electronic control unit 10 sets a travel route from the pickup and drop-off area 5 to the empty parking space 3 based on the map data of the parking lot 1 stored in the memory 13. Next, in step 42, the electronic control unit 10 determines such a travel trajectory and travel speed of the autonomous vehicle 6 that the autonomous vehicle 6 will not come into contact with other vehicles and structures. Thereafter, the electronic control unit 10 issues an autonomous driving execution command for the autonomous vehicle 6 in step 43, and the pickup and drop-off management server 8 then sends the set empty parking space 3, travel route, travel trajectory, and travel speed and the autonomous driving execution command to the autonomous vehicle 6 in step 44.

Figure 6:
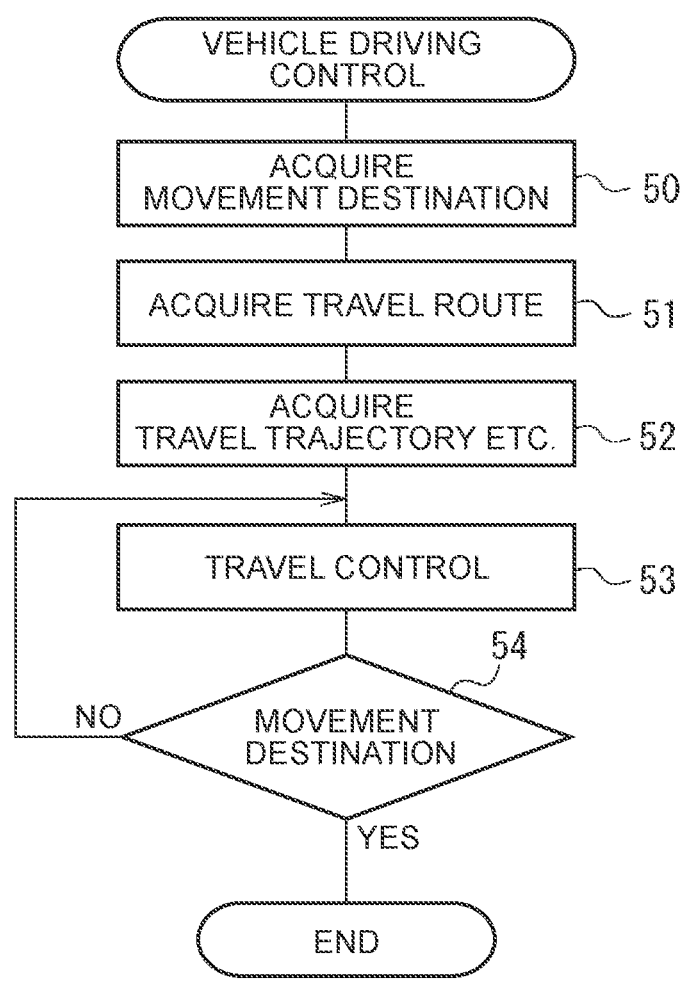
FIG. 6 is a flowchart of vehicle driving control.

When the autonomous driving execution command is sent from the pickup and drop-off management server 8 to the autonomous vehicle 6, autonomous driving control for the autonomous vehicle 6 is started. FIG. 6 shows a vehicle driving control routine for performing the autonomous driving control for the autonomous vehicle 6, and the electronic control unit 24 mounted on the autonomous vehicle 6 repeatedly executes this routine.

Referring to FIG. 6, the electronic control unit 24 first acquires the movement destination set by the pickup and drop-off management server 8 in step 50. The electronic control unit 24 then acquires the travel route set by the pickup and drop-off management server 8 in step 51, and acquires the travel trajectory and travel speed set by the pickup and drop-off management server 8 in step 52. In step 53, the electronic control unit 24 then performs travel control for the autonomous vehicle 6 along the set travel trajectory so that the autonomous vehicle 6 does not come into contact with other vehicles and pedestrians, based on the detection results from the surroundings sensors such as cameras, LIDAR sensors, or radars for capturing images of the areas such as the area ahead of the autonomous vehicle 6. Thereafter, the electronic control unit 24 determines in step 54 whether the autonomous vehicle 6 has reached the movement destination. When the electronic control unit 24 determines that the autonomous vehicle 6 has not reached the movement destination, the routine returns to step 53, and the electronic control unit 24 continues the autonomous driving of the autonomous vehicle 6. On the other hand, when the electronic control unit 24 determines in step 54 that the autonomous vehicle 6 has reached the movement destination, that is, when parking in the empty parking space 3 is completed, the drop-off management ends.

When the user desires to pick up the autonomous vehicle 6, pickup and drop-off management control is also performed using the pickup and drop-off management control routine shown in FIG. 5. In this case, the electronic control unit 10 sets the movement destination of the autonomous vehicle 6 to the pickup and drop-off area 5 in step 40 of FIG. 5, sets a travel route from the parking space 3 where the autonomous vehicle 6 is currently parked to the pickup and drop-off area 5 in step 41, sets such a travel trajectory and travel speed of the autonomous vehicle 6 that the autonomous vehicle 6 will not come into contact with other vehicles and structures in step 42, and issues an autonomous driving execution command for the autonomous vehicle 6 in step 43. The pickup and drop-off management server 8 then sends the set movement destination, travel route, travel trajectory, and travel speed and the autonomous driving execution command to the autonomous vehicle 6 in step 44. When the autonomous vehicle 6 receives the set movement destination, travel route, travel trajectory, and travel speed and the autonomous driving execution command, a pickup process for the autonomous vehicle 6 is performed according to the driving control routine for the autonomous vehicle 6 shown in FIG. 6.

Figure 7A:
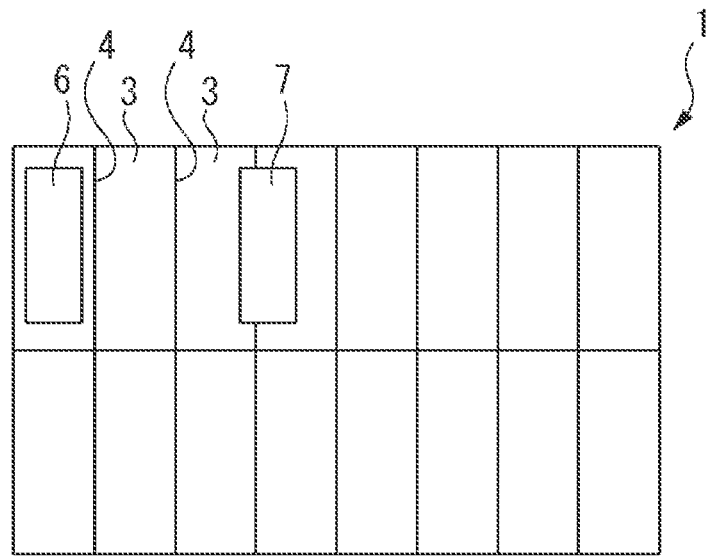
FIG. 7A is an enlarged view of a part of the parking lot shown in FIG. 1.
Figure 7B:
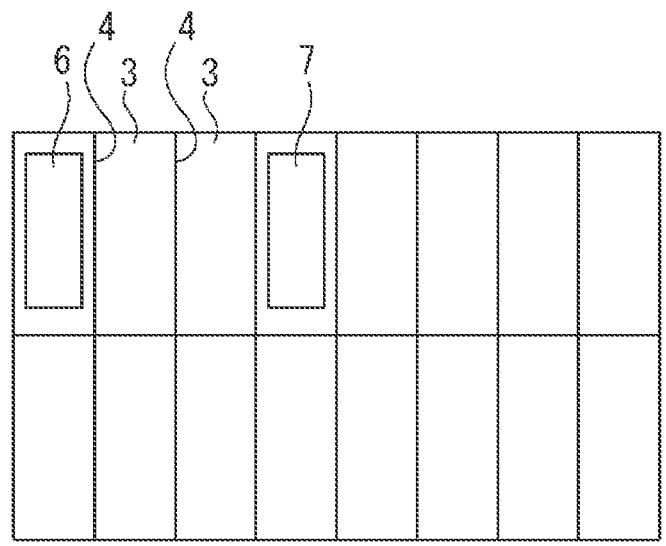
FIG. 7B is an enlarged view of a part of the parking lot shown in FIG. 1.

When the autonomous vehicle 6 is parked in the parking lot 1 under the control of the pickup and drop-off management server 8, the autonomous vehicle 6 is correctly parked inside the parking lines 4 of the parking space 3. As described above, manually driven vehicles 7 can also be parked in the automatic parking lot shown in FIGS. 1 and 2. However, manually driven vehicles 7 are not always correctly parked inside the parking lines 4 of the parking spaces 3. For example, there are cases where a manually driven vehicle 7 is parked over the parking line 4 as shown in FIG. 7A that is an enlarged view of a part of the parking lot 1 of FIG. 1.

When the manually driven vehicle 7 is parked over the parking line 4 in this manner, the parking space 3 occupied by the manually driven vehicle 7 over the parking line 4 cannot be used as a parking space 3 for an autonomous vehicle 6. As a result, the parking lot 1 cannot be effectively used for parking of vehicles. Therefore, in one embodiment according to the present disclosure, whether a manually driven vehicle 7 is parked inside the parking lines 4 is detected. When it is detected that a manually driven vehicle 7 is not parked inside the parking lines 4, a movement request is sent to the manually driven vehicle 7 to cause the manually driven vehicle 7 to be parked inside the parking lines 4.

In the embodiment according to the present disclosure, the presence of a vehicle in the parking lot 1 is detected by an object detection method based on the image signals captured by the infrastructure sensors S1, S2, S3, and S4. The pickup and drop-off management server 8 manages movement of each autonomous vehicle 6 in the parking lot 1. Therefore, whether the vehicle detected by the object detection method is an autonomous vehicle 6 or a manually driven vehicle 7 can be identified. Whether a manually driven vehicle 7 is being operated for parking or is parked can be identified based on the image signals captured by the infrastructure sensors S1, S2, S3, and S4. Moreover, whether a manually driven vehicle 7 is parked inside the parking lines 4 can be detected based on the image signals captured by the infrastructure sensors S1, S2, S3, and S4 and the map data of the parking lot 1 stored in the memory 13.

Therefore, in one embodiment according to the present disclosure, whether a manually driven vehicle 7 is parked inside the parking lines 4 is detected based on the image signals captured by the infrastructure sensors S1, S2, S3, and S4 and the map data of the parking lot 1 stored in the memory 13. An autonomous vehicle 6 is provided with a camera for capturing, for example, the area ahead of the autonomous vehicle 6. The capturing range of the camera is shown by θ in FIG. 1. Therefore, an image signal captured by the camera of the autonomous vehicle 6 is sent to the pickup and drop-off management server 8, and whether a manually driven vehicle 7 is parked inside the parking lines 4 can be detected using the image signal captured by the camera of the autonomous vehicle 6 or using both the image signal captured by the camera of the autonomous vehicle 6 and the image signals captured by the infrastructure sensors S1, S2, S3, and S4.

In one embodiment according to the present disclosure, when it is detected that a manually driven vehicle 7 is not parked inside the parking lines 4, the manually driven vehicle 7 is moved so as to be parked inside the parking lines 4. In this case, in one embodiment according to the present disclosure, the driver of the manually driven vehicle 7 is notified that the manually driven vehicle 7 is not parked inside the parking lines 4, and the driver of the manually driven vehicle 7 is requested to move the manual driving vehicle 7 and park the manually driven vehicle 7 inside the parking lines 4. That is, the driver of the manually driven vehicle 7 is requested to repark the manually driven vehicle 7.

In this case, in one embodiment according to the present disclosure, a voice generator or screen display device installed in either or both of the parking lot 1 and the manually driven vehicle 7 is used to notify the driver of the manually driven vehicle 7 that the manually driven vehicle 7 is not parked inside the parking lines 4. In this case, the voice generator is, for example, a speaker 36 installed in the parking lot 1 as shown in FIG. 2. The screen display device is, for example, a display system installed in the parking lot 1 in order to notify by words displayed on the screen that the manually driven vehicle 7 is not parked inside the parking lines 4.

In the case where the manually driven vehicle 7 is equipped with a device capable of communicating with the pickup and drop-off management server 8 and the manually driven vehicle 7 is required to be ready for communication with the pickup and drop-off management server 8 when parking in the parking lot 1, the voice generator that notifies by voice that the manually driven vehicle 7 is not parked inside the parking lines 4 may be a voice device installed in the manually driven vehicle 7, and the screen display device that notifies by words displayed on the screen that the manually driven vehicle 7 is not parked inside the parking lines 4 may be a display device installed in the manually driven vehicle 7. In this case, it is also possible to notify a mobile terminal of the driver of the manually driven vehicle 7 that the manually driven vehicle 7 is not parked inside the parking lines 4.

Figure 8:
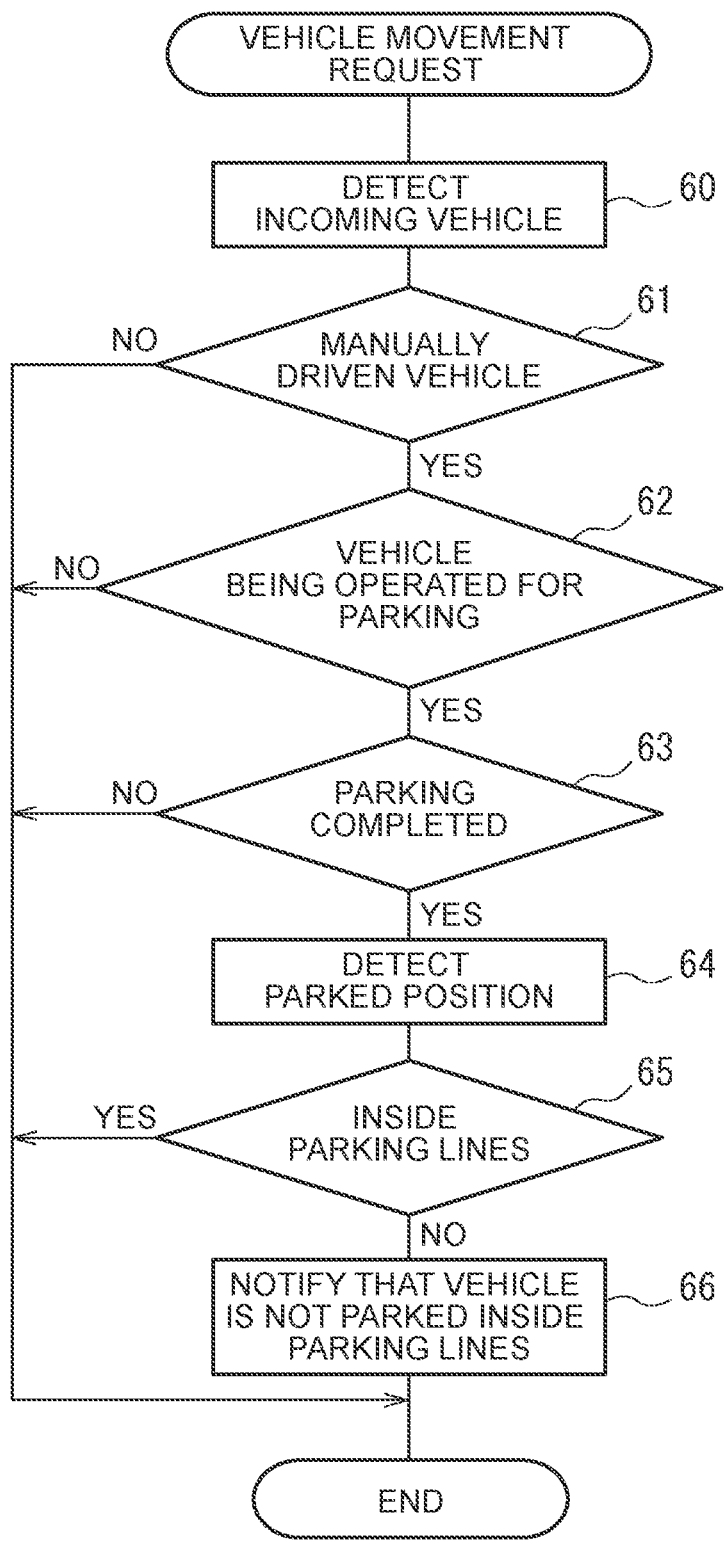
FIG. 8 is a flowchart of a vehicle movement request process of requesting a manually driven vehicle to move.

FIG. 8 shows a vehicle movement request routine for requesting a manually driven vehicle 7 not parked inside the parking lines 4 to move and park inside the parking lines 4. The electronic control unit 10 of the pickup and drop-off management server 8 repeatedly executes this routine.

Referring to FIG. 8, the electronic control unit 10 first detects an incoming vehicle based on the image signals captured by the infrastructure sensors S1, S2, S3, and S4 in step 60. Next, the electronic control unit 10 determines in step 61 whether the incoming vehicle is a manually driven vehicle 7. When the electronic control unit 10 determines that the incoming vehicle is not a manually driven vehicle 7, the processing cycle ends. On the other hand, when the electronic control unit 10 determines that the incoming vehicle is a manually driven vehicle 7, the routine proceeds to step 62, and the electronic control unit 10 determines whether the manually driven vehicle 7 is being operated for parking. When the electronic control unit 10 determines that the manually driven vehicle 7 is not being operated for parking, the processing cycle ends. On the other hand, when the electronic control unit 10 determines that the manually driven vehicle 7 is being operated for parking, the routine proceeds to step 63.

In step 63, the electronic control unit 10 determines whether the vehicle operation for parking is completed, based on the image signals captured by the infrastructure sensors S1, S2, S3, and S4. For example, when the manually driven vehicle 7 is stopped for a certain period of time after the vehicle operation for parking in the parking space 3 is performed, the electronic control unit 10 determines that the vehicle operation for parking is completed. When the electronic control unit 10 determines that the vehicle operation for parking is not completed, the processing cycle ends. On the other hand, when the electronic control unit 10 determines that the vehicle operation for parking is completed, the routine proceeds to step 64, and the electronic control unit 10 detects the parked position of the manually driven vehicle 7 based on the image signals captured by the infrastructure sensors S1, S2, S3, and S4 and the map data of the parking lot 1 stored in the memory 13.

The electronic control unit 10 then determines in step 65 whether the manually driven vehicle 7 is parked inside the parking lines 4, based on the detected parked position. When the electronic control unit 10 determines that the manually driven vehicle 7 is parked inside the parking lines 4, the processing cycle ends. On the other hand, when the electronic control unit 10 determines that the manually driven vehicle 7 is not parked inside the parking lines 4, the routine proceeds to step 66, and the electronic control unit 10 notifies the driver of this manually driven vehicle 7 that the manually driven vehicle 7 is not parked inside the parking lines 4 by using the above voice generator or screen display device. For example, the speaker 36 installed in the parking lot 1 generates a voice message such as "Your vehicle is parked over the parking line. Please move and park your vehicle inside the parking lines."

Figure 9A:
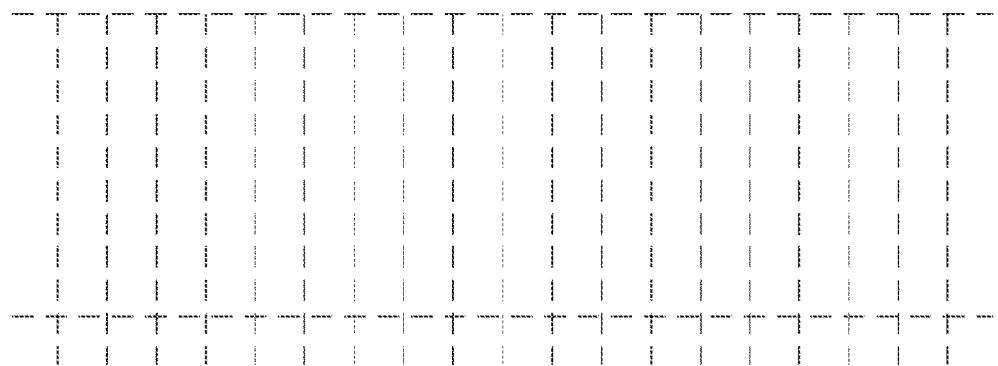
FIG. 9A is an enlarged view of a part of the parking lot shown in FIG. 1.
Figure 9B:
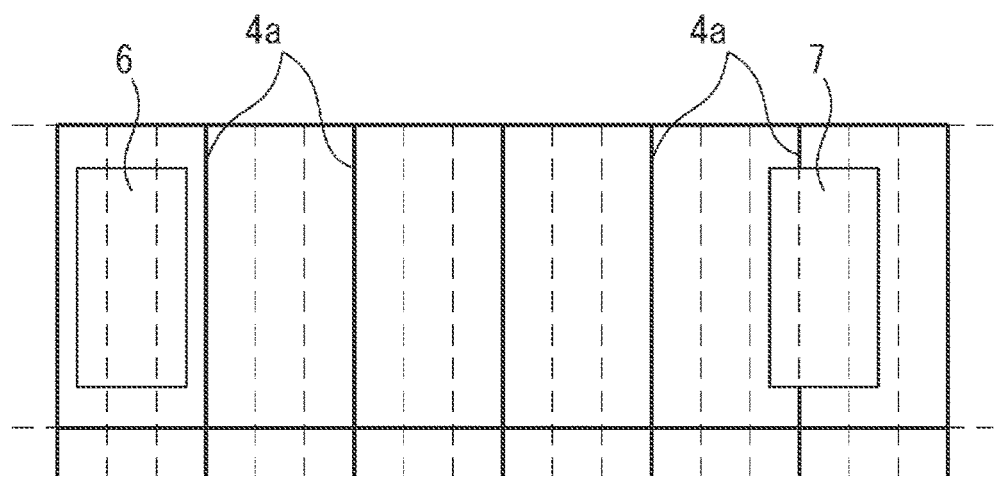
FIG. 9B is an enlarged view of a part of the parking lot shown in FIG. 1.
Figure 9C:
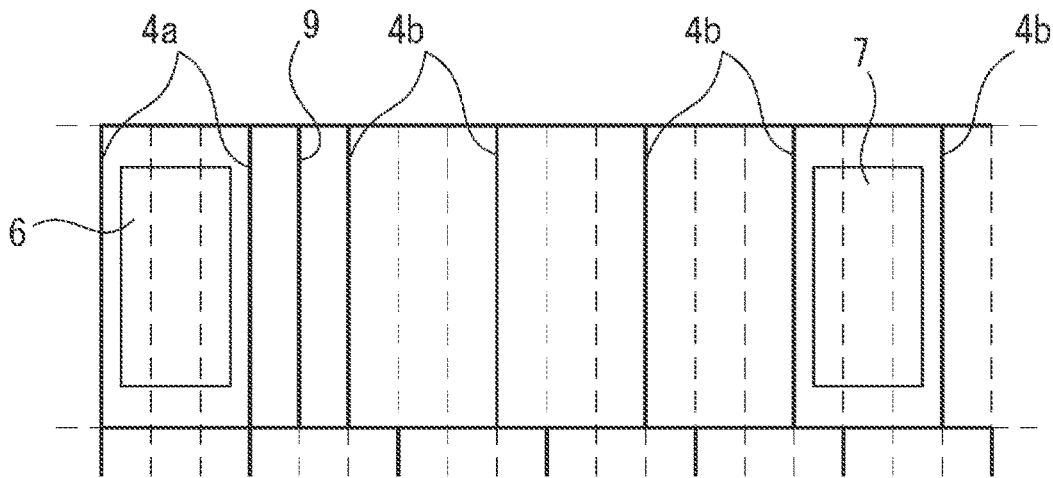
FIG. 9C is an enlarged view of a part of the parking lot shown in FIG. 1.

Another embodiment according to the present disclosure will be described with reference to FIGS. 9A to 9C. FIGS. 9A to 9C are enlarged views of a part of the parking lot 1 shown in FIG. 1. In this embodiment, a large number of light emitters, such as light emitting-diode (LED) lights, for indicating the parking lines 4 are installed on the floor surface of the parking lot 1 along dashed lines in FIG. 9A. Of these light emitters, only the light emitters located in the portions shown by continuous lines in FIG. 9B are usually caused to emit light, and the portions shown by the continuous lines, namely the portions that are emitting light, indicate the parking lines 4. As shown in FIG. 9B, an autonomous vehicle 6 is usually parked inside reference parking lines 4a. The reference parking lines 4a refer to the parking lines 4 that are usually indicated by the light emitters.

FIG. 9B also shows a manually driven vehicle 7 parked over the reference parking line 4a. In this case, in this embodiment, the parking lines are moved. That is, in this embodiment, whether a manually driven vehicle 7 is parked inside the parking lines 4 is detected, and when it is detected that a manually driven vehicle 7 is not parked inside the reference parking lines 4a, the parking lines are moved so that the manually driven vehicle 7 is parked inside the parking lines 4. FIG. 9C shows an example in which the parking lines are moved so that the manually driven vehicle 7 is parked inside the parking lines 4.

Referring to FIG. 9C, in this example, the light emitters that are caused to emit light are changed so that the manually driven vehicle 7 parked over the reference parking line 4a fits within the parking lines 4. In this case, when the manually driven vehicle 7 is parked over the reference parking line 4a, the light emitters that are caused to emit light are changed from the light emitters indicating the reference parking lines 4a to the light emitters indicating auxiliary parking lines 4b. The auxiliary parking lines 4b refer to the parking lines 4 within which the manually driven vehicle 7 parked over the reference parking line 4a fits. In this case, not all of the reference parking lines 4a are switched to the auxiliary parking lines 4b. As shown in FIG. 9C, a part of the reference parking lines 4a is maintained as it is. In this case, as shown in FIG. 9C, the light emitters in the portion shown by a continuous line 9 may also be caused to emit light in order to indicate that the spaces on both sides of the continuous line 9 will not be used as parking spaces.

In this case, the reference parking lines 4a and the auxiliary parking lines 4b may be indicated by, for example, a light beam emitted from a light beam generator 37 installed on the ceiling of the parking lot building 2 as shown in FIG. 2 onto the floor surface of the parking lot 1. That is, in this embodiment, a parking line indication device is provided that can selectively indicate the reference parking lines 4a and the auxiliary parking lines 4b shifted with respect to the reference parking lines 4a. When it is detected that the manually driven vehicle 7 is not parked inside the indicated reference parking lines 4a, indication of the parking lines is switched from the reference parking lines 4a to the auxiliary parking lines 4b in such a manner that the manually driven vehicle 7 is parked inside the parking lines. In this case, the parking line indication device is the light emitters installed on the floor surface of the parking lot 1 or the light beam generator 37 that emits a light beam onto the floor surface of the parking lot 1.

Figure 10:
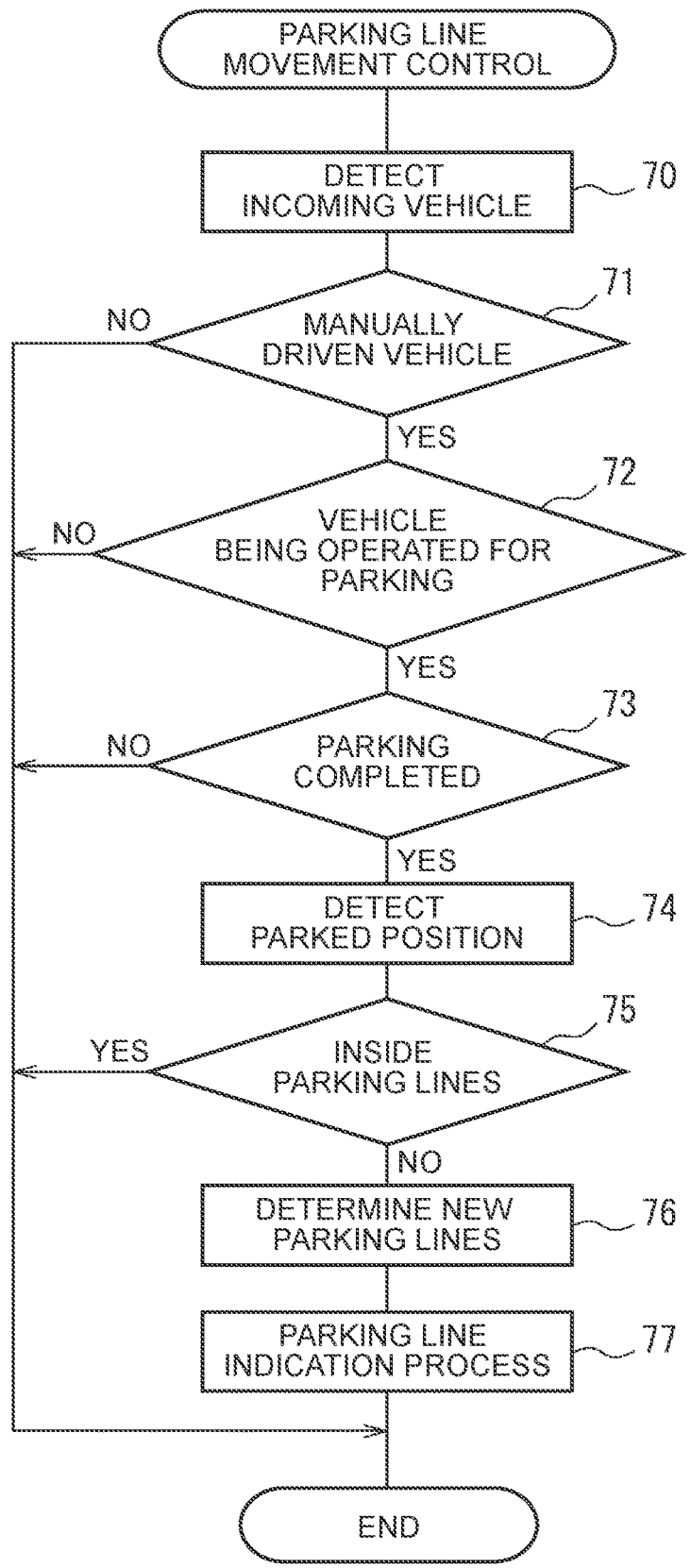
FIG. 10 is a flowchart of parking line movement control.

FIG. 10 shows a parking line movement control routine for controlling movement of the parking lines. The electronic control unit 10 of the pickup and drop-off management server 8 repeatedly executes this routine. Steps 70 to 75 of the parking line movement control routine shown in FIG. 10 are the same as steps 60 to 65 of the vehicle movement request routine shown in FIG. 8.

That is, referring to FIG. 10, the electronic control unit 10 first detects an incoming vehicle based on the image signals captured by the infrastructure sensors S1, S2, S3, and S4 in step 70. Next, the electronic control unit 10 determines in step 71 whether the incoming vehicle is a manually driven vehicle 7. The electronic control unit 10 then determines in step 72 whether the manually driven vehicle 7 is being operated for parking. Thereafter, the electronic control unit 10 determines in step 73 whether the vehicle operation for parking is completed, based on the image signals captured by the infrastructure sensors S1, S2, S3, and S4. In step 74, the electronic control unit 10 then detects the parked position of the manually driven vehicle 7 based on the image signals captured by the infrastructure sensors S1, S2, S3, and S4 and the map data of the parking lot 1 stored in the memory 13.

The electronic control unit 10 then determines in step 75 whether the manually driven vehicle 7 is parked inside the parking lines 4, based on the detected parked position. When the electronic control unit 10 determines that the manually driven vehicle 7 is parked inside the parking lines 4, the processing cycle ends. On the other hand, when the electronic control unit 10 determines that the manually driven vehicle 7 is not parked inside the parking lines 4, the routine proceeds to step 76, and the electronic control unit 10 determines new parking lines, namely the auxiliary parking lines 4b, based on the image signals captured by the infrastructure sensors S1, S2, S3, and S4 and the map data of the parking lot 1 stored in the memory 13. In step 77, the new parking lines are then indicated by the parking line indication device.

As described above, in the embodiment according to the present disclosure, the parking lot management system includes: a vehicle parked position detection unit configured to detect whether a vehicle is parked inside the parking lines 4 in the parking lot 1; and a movement management unit configured to, when the vehicle parked position detection unit detects that the vehicle is not parked inside the parking lines 4, move either the vehicle or the parking lines 4 in such a manner that the vehicle is parked inside the parking lines 4. In this case, the electronic control unit 10 of the pickup and drop-off management server 8 constitutes the vehicle parked position detection unit and the movement management unit.

In an embodiment according to the present disclosure, a parking management method is provided that includes: detecting whether a vehicle is parked inside the parking lines 4 in the parking lot 1; and when the vehicle is detected not parked inside the parking lines 4, moving either the vehicle or the parking lines 4 in such a manner that the vehicle is parked inside the parking lines 4. In an embodiment according to the present disclosure, a program is provided that causes a computer to perform functions including: detecting whether a vehicle is parked inside the parking lines 4 in the parking lot 1, and when the vehicle is detected not parked inside the parking lines 4, moving either the vehicle or the parking lines 4 in such a manner that the vehicle is parked inside the parking lines 4. The program is an example of a storage medium.

Figure 11:
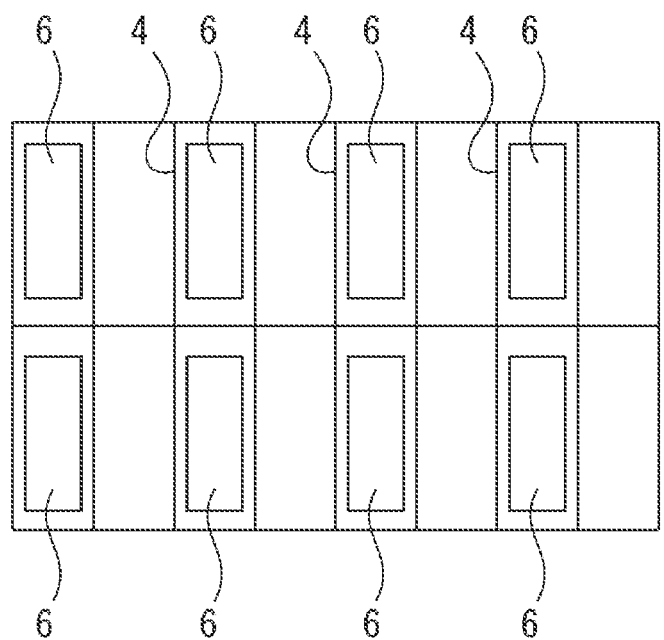
FIG. 11 is an enlarged view of a part of the parking lot shown in FIG. 1.

FIG. 11 shows still another embodiment. In this embodiment, every time there is a request to drop off an autonomous vehicle 6, each autonomous vehicle 6 is sequentially parked in every other parking space 3 as shown in FIG. 11. Sequentially parking the autonomous vehicles 6 in every other parking space 3 reduces the possibility that a manually driven vehicle 7 may be parked over the parking line 4.

What is claimed is:

1. A parking lot management system, comprising:
   a vehicle parked position detection unit configured to detect whether a vehicle is parked inside reference parking lines in a parking lot;
   a movement management unit configured to, based on a determination by the vehicle parked position detection unit that the vehicle is not parked inside the reference parking lines, move the vehicle or the reference parking lines in such a manner that the vehicle is parked inside the reference parking lines; and
   a parking line indication device configured to selectively indicate the reference parking lines and auxiliary parking lines shifted with respect to the reference parking lines after the vehicle is parked,
   wherein based on the determination by the vehicle parked position detection unit that the vehicle is not parked inside the indicated reference parking lines, indication of the reference parking lines is switched from the reference parking lines to the auxiliary parking lines in such a manner that the vehicle is parked inside the reference parking lines.

2. The parking lot management system according to claim 1, wherein when the vehicle parked position detection unit detects that the vehicle is not parked inside the reference parking lines, the movement management unit notifies a driver of the vehicle that the vehicle is not parked inside the reference parking lines, and requests the driver of the vehicle to park the vehicle inside the reference parking lines.

3. The parking lot management system according to claim 2, wherein either or both of the parking lot or the vehicle is used to notify the driver of the vehicle is notified that the vehicle is not parked inside the parking lines based on a voice generator or screen display device installed in the parking lot or the vehicle.

4. The parking lot management system according to claim 1, wherein the vehicle parked position detection unit detects whether the vehicle is parked inside the reference parking lines by an infrastructure sensor installed in the parking lot or a surroundings sensor mounted on the vehicle.

5. The parking lot management system according to claim 1, wherein the parking line indication device indicates the reference parking lines by a light emitter installed on a floor surface of the parking lot.

6. The parking lot management system according to claim 1, wherein the parking lot is an automatic parking lot that allows autonomous vehicles to be automatically parked, and the autonomous vehicles are parked in every other parking space.

7. The parking lot management system of claim 1, wherein based on the determination the vehicle parked position detection unit detects that the vehicle is not parked inside the indicated reference parking lines, indication of the reference parking lines is further switched to at least one pair of continuous lines indicating that no parking is permitted between the at least one pair of continuous lines.

8. A parking lot management method, comprising:
- detecting whether a vehicle is parked inside reference parking lines in a parking lot;
- based on a determination the vehicle is detected as not being parked inside the reference parking lines, moving the vehicle or the reference parking lines in such a manner that the vehicle is parked inside the reference parking lines; and
- selectively indicating reference parking lines and auxiliary parking lines shifted with respect to the reference parking lines after the vehicle is parked,
- wherein based on the determination that the vehicle is detected as not being parked inside the reference parking lines, indication of the reference parking lines is switched from the reference parking lines to the auxiliary parking lines in such a manner that the vehicle is parked inside the reference parking lines.

9. The parking lot management method of claim 8, wherein based on the determination that the vehicle is not parked inside the indicated reference parking lines, indication of the reference parking lines is further switched to at least one pair of continuous lines indicating that no parking is permitted between the at least one pair of continuous lines.

10. A non-transitory computer readable storage medium having instructions stored therein, which when executed by a processor in a parking lot management system cause the processor to execute a method comprising:
- detecting whether a vehicle is parked inside reference parking lines in a parking lot; and
- based on a determination the vehicle is detected as not being parked inside the reference parking lines, moving the vehicle or the reference parking lines in such a manner that the vehicle is parked inside the reference parking lines; and
- selectively indicating reference parking lines and auxiliary parking lines shifted with respect to the reference parking lines after the vehicle is parked,
- wherein based on the determination that the vehicle is detected as not being parked inside the reference parking lines, indication of the reference parking lines is switched from the reference parking lines to the auxiliary parking lines in such a manner that the vehicle is parked inside the reference parking lines.

11. The non-transitory computer readable storage medium of claim 10, wherein based on the determination that the vehicle is not parked inside the indicated reference parking lines, indication of the reference parking lines is further switched to at least one pair of continuous lines indicating that no parking is permitted between the at least one pair of continuous lines.

* * * * *